(12) United States Patent
Zecheria et al.

(10) Patent No.: US 8,744,820 B2
(45) Date of Patent: Jun. 3, 2014

(54) INTEGRATION OF WORKFLOWS FROM VARIOUS SYSTEMS

(75) Inventors: Tizil Zecheria, Tamil Nadu (IN); Srinivas Venkatraman, Tamil Nadu (IN); Ganesh Kumar, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 13/034,189

(22) Filed: Feb. 24, 2011

(65) Prior Publication Data

US 2012/0221304 A1    Aug. 30, 2012

(51) Int. Cl.
*G06G 7/48* (2006.01)

(52) U.S. Cl.
USPC .......................................................... 703/6

(58) Field of Classification Search
USPC .......................................................... 703/6
See application file for complete search history.

(56) References Cited

U.S. PATENT DOCUMENTS

| | | | | |
|---|---|---|---|---|
| 7,295,957 B2* | 11/2007 | Pulfer | | 703/6 |
| 7,822,594 B2* | 10/2010 | Haviv et al. | | 703/21 |
| 8,280,716 B2* | 10/2012 | Haviv et al. | | 703/21 |
| 8,281,305 B2* | 10/2012 | Otani | | 718/1 |
| 8,316,305 B2* | 11/2012 | Jaisinghani | | 715/734 |
| 8,428,984 B2* | 4/2013 | Xu et al. | | 705/7.11 |
| 2003/0018490 A1* | 1/2003 | Magers et al. | | 705/1 |
| 2009/0228253 A1* | 9/2009 | Tolone et al. | | 703/6 |
| 2009/0281777 A1* | 11/2009 | Baeuerle et al. | | 703/6 |
| 2009/0292514 A1* | 11/2009 | McKim et al. | | 703/6 |
| 2011/0004457 A1* | 1/2011 | Haviv et al. | | 703/21 |

\* cited by examiner

*Primary Examiner* — Matt Kim
*Assistant Examiner* — Maryam Ipakchi

(57) ABSTRACT

A particular system receives an order to be modeled as a workflow, and creates a particular system workflow based on the order. The particular system also provides the particular system workflow to application programming interfaces (APIs) associated with the particular system, and receives, via the APIs, a workflow associated with another system. The particular system further provides, via the APIs, the particular system workflow to the other system, and combines the particular system workflow with the other system workflow to create a combined workflow. The particular system enables a user device to access, via the particular system, one or more of the combined workflow, the particular system workflow, and the other system workflow.

20 Claims, 7 Drawing Sheets

INTEGRATION OF WORKFLOWS FROM VARIOUS SYSTEMS

BACKGROUND

Workflow is a depiction of a sequence of operations, such as work of a person, a group of persons, an organization of staff, or one or more simple or complex mechanisms. Workflow may be seen as any abstraction of real work. For control purposes, workflow may serve as a virtual representation of actual work. Workflow enables information technology (IT) applications to perform a complex activity that is divided into tasks, and to manage flows between the tasks based on various conditions (e.g., business conditions). Several business software solutions are integrating workflow into business logic that decides a route to be taken for a particular transaction in the software.

Various implementations of a workflow model are available for a variety of IT systems. For example, some IT systems implement workflow based on simple "if-else" loops. Other IT systems may utilize graph-based logic to implement workflow, or may utilize database status transition-based logic to implement workflow. Enterprise systems may include various IT systems, such ordering IT systems, provisioning IT systems, engineering IT systems, billing IT systems, security IT systems, etc. A transaction (e.g., an order) may enter the enterprise system and may travel through each of the various IT systems. Each of the various IT systems may include a different workflow implementation. However, in enterprise systems (or other systems implementing various IT systems with different workflow models), a user connected to a particular IT system (e.g., a provisioning IT system) can only view the workflow produced by the particular IT system, and cannot view the workflows produced by the other IT systems (e.g., an ordering IT system, an engineering IT system, etc.).

DETAILED DESCRIPTION OF PREFERRED EMBODIMENTS

The following detailed description refers to the accompanying drawings. The same reference numbers in different drawings may identify the same or similar elements.

Systems and/or methods described herein may enable workflows from different systems (e.g., a provisioning system, a procurement system, etc.) to be integrated so that workflows spanning multiple systems may be viewed and/or controlled by a user device (e.g., a computer) connected to any of the multiple systems. In one example implementation, a particular system may receive an order (or a transaction) to be modeled as a workflow, and may create, based on the order, a workflow associated with the particular system. The particular system may provide the particular system workflow to one or more application programming interfaces (APIs) associated with the particular system, and may receive, via the API(s), one or more workflows associated with one or more other systems. The particular system may provide, via the API(s), the particular system workflow to the other system(s), and may combine the particular system workflow with the other system(s) workflow(s) to create a combined workflow. The particular system may enable a user device to access, control, and/or view the combined workflow, the particular system workflow, and/or the other system(s) workflow(s). The user device may also access, control, and/or view the combined workflow, the particular system workflow, and/or the other system(s) workflow(s) via one or more of the other systems.

The term "component," as used herein, is intended to be broadly construed to include hardware (e.g., a device, a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
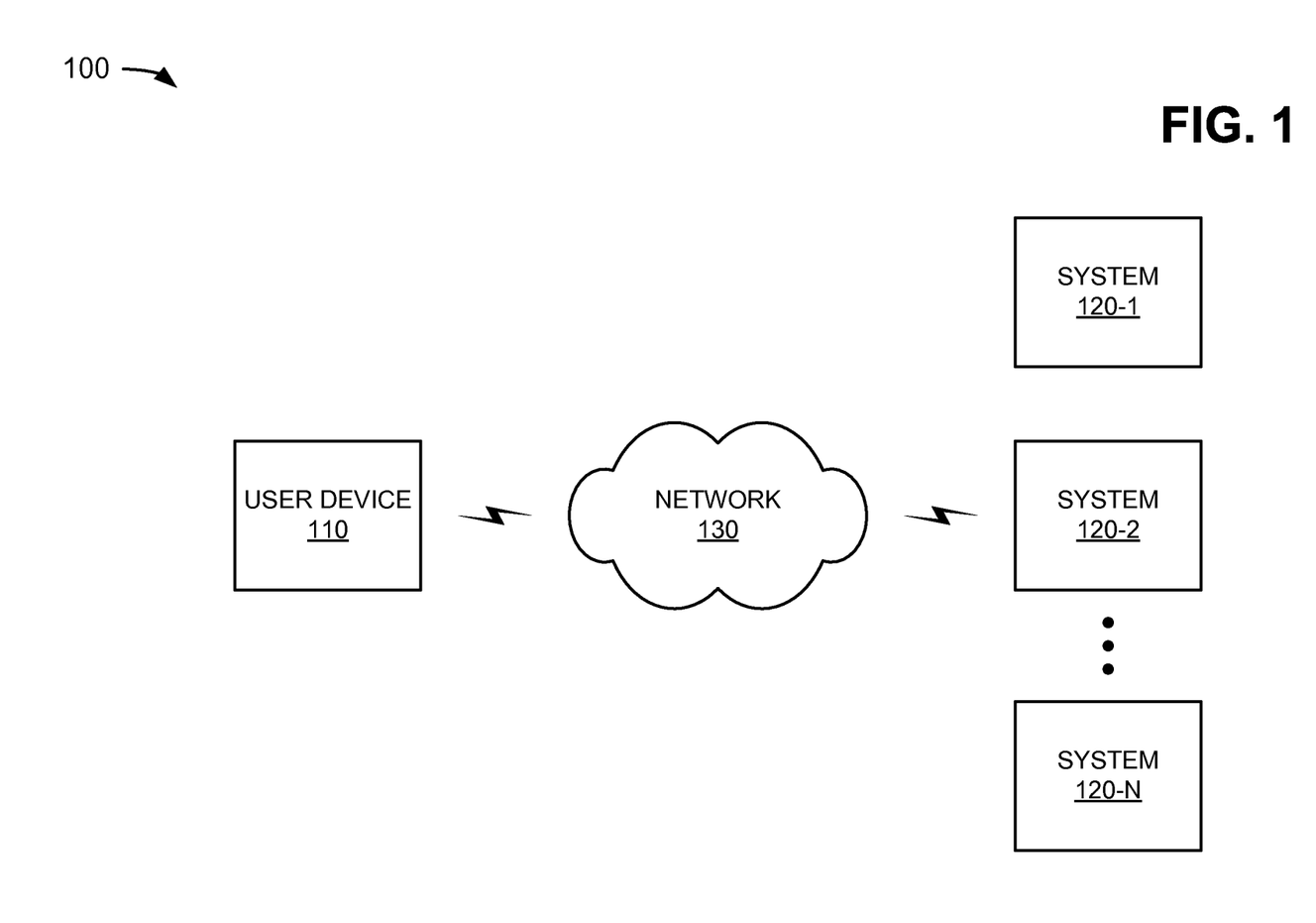
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110 and one or more systems 120-1, 120-2, ..., 120-N (collectively referred to herein as "systems 120," and, in some instances, singularly as "system 120") interconnected by a network 130. Components of network 100 may interconnect via wired and/or wireless connections or links. One user device 110, three systems 120, and one network 130 have been illustrated in FIG. 1 for simplicity. In practice, there may be more user devices 110, systems 120, and/or networks 130. Also, in some instances, one or more of the components of network 100 may perform one or more functions described as being performed by another one or more of the components of network 100.

User device 110 may include one or more devices capable of accessing systems 120, providing information to systems 120, and/or receiving information from systems 120. User device 110 may include, for example, a workstation computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer, a personal computer, a tablet computer, etc.

System 120 may include one or more server devices, or other types of computation or communication devices, that gather, process, and/or provide information in a manner described herein. In one example, system 120 may include one or more IT systems that generate one or more workflow models. The workflow models may enable the IT system(s) to perform a complex activity that is divided into tasks, and to manage flows between the tasks based on various conditions (e.g., business conditions).

In one example implementation, a workflow may span across multiple systems 120, and a particular system (e.g., system 120-1) may receive an order (or a transaction) to be modeled as the workflow spanning across multiple systems 120. System 120-1 may create, based on the order, a particular workflow associated with system 120-1 (e.g., a portion of the workflow that is implemented by system 120-1), and may provide the particular workflow to one or more APIs associated with system 120-1. System 120-1 may receive, via the API(s), one or more other workflows associated with one or more other systems (e.g., systems 120-2 through 120-N), and may provide, via the API(s), the particular workflow to systems 120-2 through 120-N. System 120-1 may combine the particular workflow with the other workflows, associated with systems 120-2 through 120-N, to create a combined workflow, and may enable user device 110 to access and/or view the combined workflow, the particular workflow, and/or the other workflows. User device 110 may also access and/or view the combined workflow, the particular workflow, and/or the other workflows via one or more of systems 120-2 through 120-N.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one example implementation, network 130 may enable user device 110 to communicate with one or more systems 120. In another example implementation, network 130 may be omitted and user device 110 may connect and communicate directly with one or more systems 120.

Although FIG. 1 shows example components of network 100, in other implementations, network 100 may contain fewer components, different components, differently arranged components, or additional components than depicted in FIG. 1.

Figure 2:
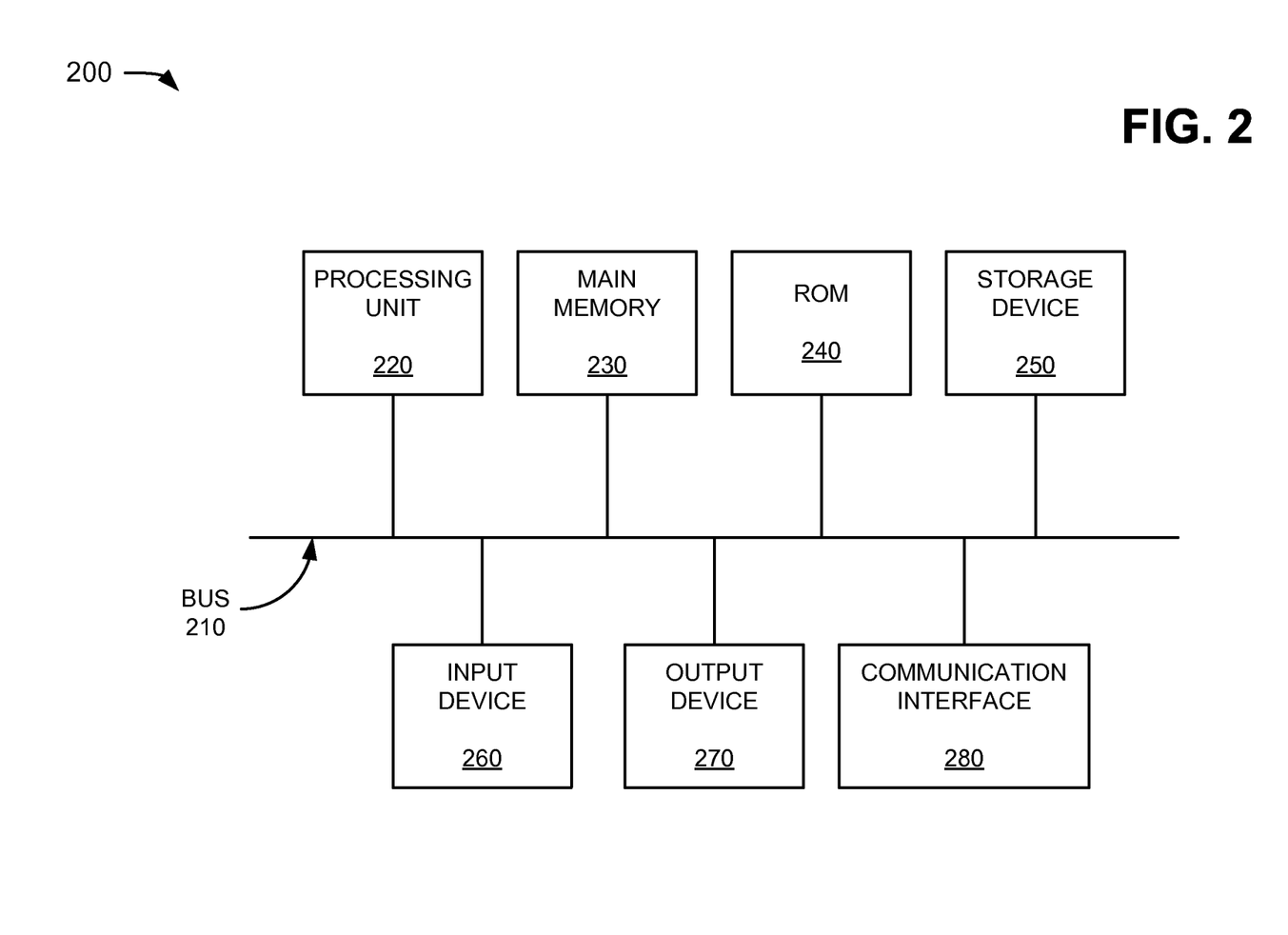
FIG. 2 is a diagram of example components of one or more devices of the network depicted in FIG. 1.

FIG. 2 is a diagram of example components of a device 200 that may correspond to one or more devices of network 100. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
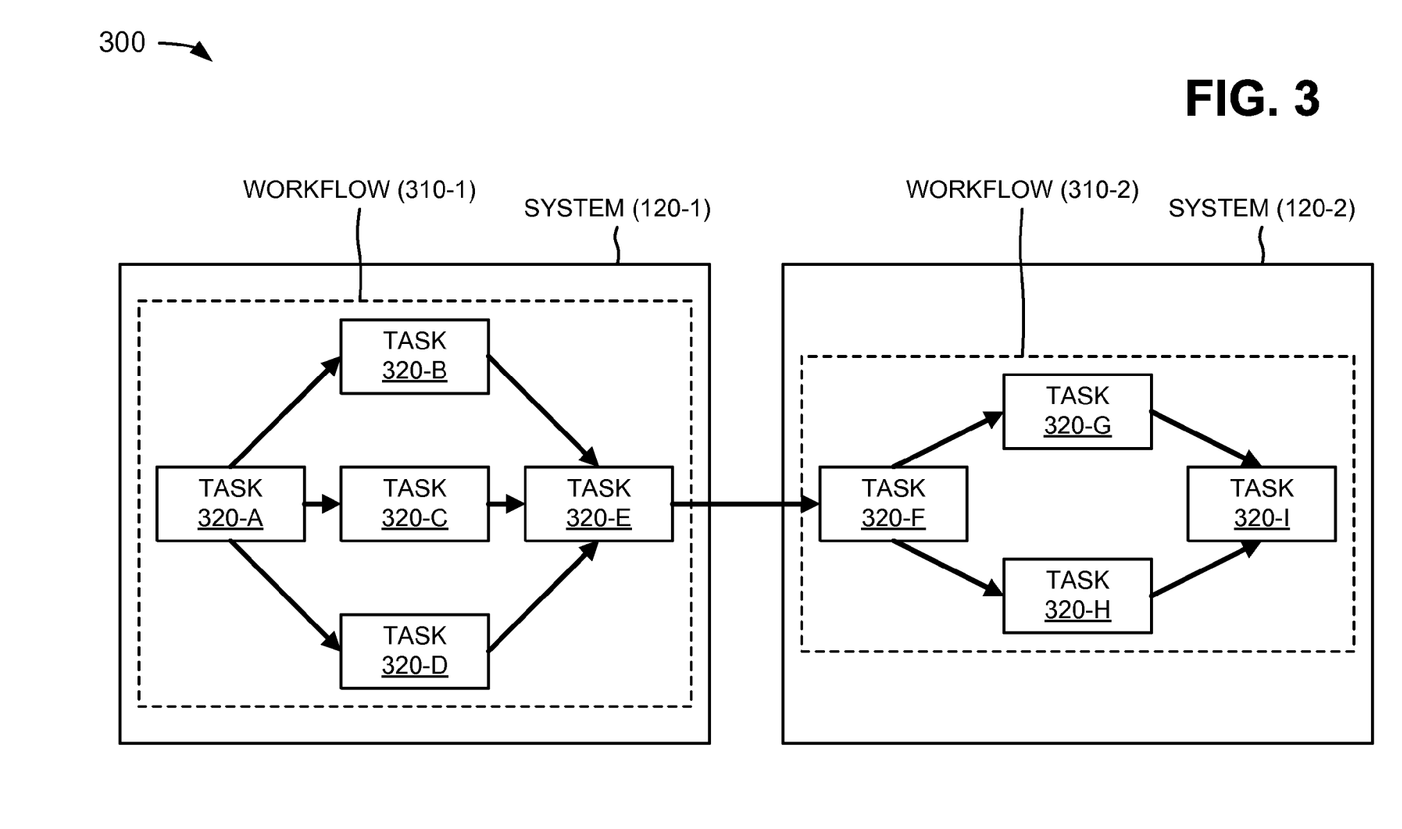
FIG. 3 is a diagram of example operations capable of being performed by an example portion of the network illustrated in FIG. 1.

FIG. 3 is a diagram of example operations capable of being performed by an example portion 300 of network 100. As shown, example network portion 300 may include systems 120-1 and 120-2. Systems 120-1 and 120-2 may include the features described above in connection with one or more of, for example, FIGS. 1 and 2. As further shown in FIG. 3, system 120-1 may include a workflow 310-1 that includes multiple tasks 320-A through 320-E (collectively referred to herein as "tasks 320," and, in some instances, singularly as "task 320"); and system 120-2 may include a workflow 310-2 that includes multiple tasks 320-F through 320-I.

Each of workflows 310-1 and 310-2 (collectively referred to herein as "workflows 310," and, in some instances, singularly as "workflow 320") may include a depiction of a sequence of operations (e.g., tasks 320), such as work of a person, a group of persons, an organization of staff, or one or more simple or complex mechanisms (e.g., devices). Workflow 310 may be an abstraction of real work, and may serve as a virtual representation of actual work. Workflow 310 may enable IT applications (e.g., provided in systems 120) to perform a complex activity that is divided into tasks (e.g., tasks 320), and to manage flows between tasks 320 based on various conditions (e.g., business conditions). A complete workflow (e.g., for a transaction or an order) may include workflows 310-1 and 310-2, and may span multiple systems (e.g., systems 120-1 and 120-2). In one example, workflows 310-1 and 310-2 may be associated with establishing connectivity between two locations that are owned and/or operated by a telecommunications company.

Task 320 may include a virtual representation of an operation performed by a person, a group of persons, an organization, etc.; an operation performed by a device (e.g., a machine, a computing device, a network device, a network, etc.); an operation performed by a human and a device; etc. Task 320 may be defined by an input description, transformation information, and/or an output description. The input description of task 320 may include information, material, energy, etc. needed to complete task 320. The transformation information of task 320 may include transformation rules, algorithms, etc. that may be performed by humans, devices, or a combination of humans and devices. The output description of task 320 may include information, material, energy, etc. produced by task 320 and provided as input to downstream tasks 320.

As further shown in the example workflow 310-1 of FIG. 3, there may three routes from task 320-A to task 320-E. For example, system 120-1 may decide an optimal route to reach task 320-E based on traffic provided between tasks 320-A and 320-B, traffic provided between tasks 320-A and 320-C, and traffic provided between tasks 320-A and 320-D (e.g., on a particular day). For some workflows (e.g., workflow 310-1), time may be a critical resource, and for other workflows, energy may be a critical resource. Thus, a selected route from task 320-A to task 320-E (e.g., as selected by system 120-1) may depend on various parameters, such as time, distance, energy, traffic, bandwidth, etc. Furthermore, in some workflows, a transaction may require various routes to be completely processed. After selection of the route from task 320-A to task 320-E and performance of operations by the selected tasks 320, task 320-E may perform an operation(s) defined by task 320-E (e.g., install cabling between two network devices) and the transaction may continue to workflow 310-2.

In the example workflow 310-2, task 320-F may receive the output from task 320-E, and there may two routes from task 320-F to task 320-I. For example, system 120-2 may decide an optimal route to reach task 320-I based on traffic provided between tasks 320-F and 320-G, and traffic provided between tasks 320-F and 320-H (e.g., on a particular day). A selected route from task 320-F to task 320-I (e.g., as selected by system 120-2) may depend on various parameters, such as time, distance, energy, traffic, bandwidth, etc. Furthermore, in some workflows, a transaction may require various routes to be completely processed. After selection of the route from task 320-F to task 320-I and performance of operations by the selected tasks 320, task 320-I may perform an operation(s) defined by task 320-I (e.g., initializing network devices) and the transaction may cease.

In current systems (e.g., systems implementing various IT systems with different workflow models), if user device 110 (not shown in FIG. 3) is connected to system 120-1, user device 110 may only view workflow 310-1 produced by system 120-1, and cannot view workflow 310-2 produced by system 120-2. Similarly, in current systems, if user device 110 is connected to system 120-2, user device 110 may only view workflow 310-2 produced by system 120-2, and cannot view workflow 310-1 produced by system 120-1. In contrast, implementations described herein may enable workflows (e.g., workflows 310-1 and 310-2) from different systems (e.g., systems 120-1 and 120-2) to be integrated so that workflows 310-1 and 310-2 spanning multiple systems (e.g., systems 120-1 and 120-2) may be viewed by user device 110 when user device 110 connects to either one of systems 120-1 and 120-2.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4:
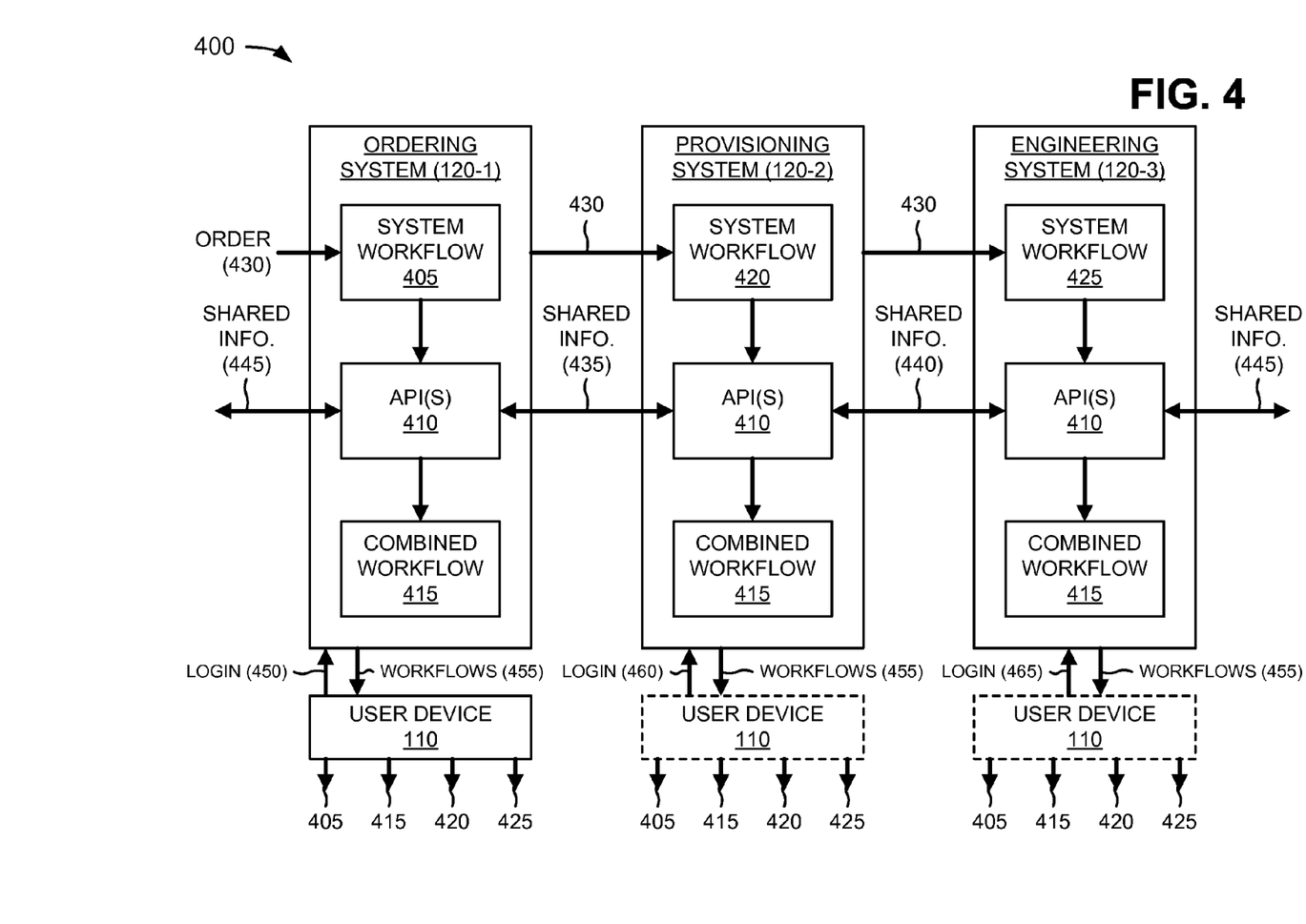
FIG. 4 is a diagram of further example operations capable of being performed by another example portion of the network depicted in FIG. 1.

FIG. 4 is a diagram of further example operations capable of being performed by another example portion 400 of network 100. As shown, example network portion 400 may include user device 110, and systems 120-1 through 120-3. User device 110 and systems 120-1 through 120-3 may include the features described above in connection with one or more of, for example, FIGS. 1-3. In one example, system 120-1 may correspond to an ordering system, system 120-2 may correspond to a provisioning system, and system 120-3 may correspond to an engineering system. Ordering system 120-1 may include a system workflow 405, one or more APIs 410, and a combined workflow 415. Provisioning system 120-2 may include API(s) 410, combined workflow 415, and a system workflow 420. Engineering system 120-3 may include API(s) 410, combined workflow 415, and a system workflow 425.

System workflow 405 may include a workflow (e.g., workflow 310) generated by ordering system 120-1 in response to an order 430 (e.g., to be modeled as a workflow) being received by ordering system 120-1. In one example implementation, network portion 400 may be associated with a telecommunications company, and may be used by the telecommunications company to complete an order (e.g., order 430) to establish connectivity between two locations (e.g., owned and/or operated by the telecommunications company). System workflow 405 may include various tasks (e.g., tasks 320) associated with functions performed by ordering system 120-1, such as a task for receiving order 430, a task for validating order 430 (e.g., based on an address of person associated with order 430), a task for validating order 430 (e.g., based on a credit worthiness of the person associated with order 430), etc. Ordering system 120-1 may forward order 430 to system workflow 420 of provisioning system 120-2, and may provide system workflow 405 to API(s) 410 of ordering system 120-1.

API(s) 410 may include one or more rules and/or specifications that a software program (e.g., provided in one system 120) can follow to access and make use of services and/or resources provided by another particular software program (e.g., provided in another system 120) that implements API(s) 410. API(s) 410 may serve as an interface between different software programs (e.g., provided in different systems 120), and may facilitate interaction of the different software programs. API(s) 410 may be created for applications, libraries, operating systems, etc., as a way to define "vocabularies" and resources/or request conventions (e.g., function-calling conventions). API(s) 410 may include specifications for routines, data structures, object classes, and/or protocols used to communicate between different systems 120.

In one example implementation, API(s) 410 may enable ordering system 120-1 to share information 435 (e.g., information associated with system workflow 405) with provisioning system 120-2, and may enable provisioning system 120-2 to share information 435 (e.g., information associated with system workflow 420) with ordering system 120-1. API(s) 410 may enable provisioning system 120-2 to share information 440 (e.g., information associated with system workflow 420) with engineering system 120-3, and may enable engineering system 120-3 to share information 440 (e.g., information associated with system workflow 425) with provisioning system 120-2. Furthermore, API(s) 410 may enable ordering system 120-1 to share information 445 (e.g., information associated with system workflow 405) with engineering system 120-3, and may enable engineering system 120-3 to share information 445 (e.g., information associated with system workflow 425) with ordering system 120-1.

In one example implementation, API(s) 410 may enable one system 120 to recognize and understand a workflow generated by another system 120. For example, API(s) 410 may enable ordering system 120-1 to recognize and understand system workflow 420 (e.g., received from provisioning system 120-2 via shared information 435) and system workflow 425 (e.g., received from engineering system 120-2 via shared information 445). API(s) 410 may enable provisioning system 120-2 to recognize and understand system workflow 405 (e.g., received from ordering system 120-1 via shared information 435) and system workflow 425 (e.g., received from engineering system 120-3 via shared information 440). Furthermore, API(s) 410 may enable engineering system 120-3 to recognize and understand system workflow 405

(e.g., received from ordering system 120-1 via shared information 445) and system workflow 420 (e.g., received from provisioning system 120-2 via shared information 440).

In another example implementation, API(s) 410 may permit workflows between systems 120-1 through 120-3 (e.g., system workflow 405, system workflow 420, and system workflow 425) to be loosely coupled. For example, API(s) 410 may provide functionality so that system workflow 425 of engineering system 120-3 may not introduce any changes (e.g., impact) to system workflow 420 of provisioning system 120-2. Without such an arrangement, every time system workflow 425 (e.g., of engineering system 120-3) changes, the changes may impact system workflow 405 (e.g., of ordering system 120-1) and system workflow 420 (e.g., of provisioning system 120-2), which may increase the complexity of the transaction (e.g., order 430). Further details of API(s) 410 are provided below in connection with FIG. 5.

Combined workflow 415 may include a combination of the workflows (e.g., workflows 310) generated by ordering system 120-1 (e.g., system workflow 405), provisioning system 120-2 (e.g., system workflow 420), and engineering system 120-3 (e.g., system workflow 425). For example, ordering system 120-1 may receive system workflow 420 from provisioning system 120-2 (e.g., via API(s) 410), and may receive system workflow 425 from engineering system 120-3 (e.g., via API(s) 410). Ordering system 120-1 may combine system workflow 405, system workflow 420, and system workflow 425 together to produce combined workflow 415. Provisioning system 120-2 may receive system workflow 405 from ordering system 120-1 (e.g., via API(s) 410), and may receive system workflow 425 from engineering system 120-3 (e.g., via API(s) 410). Provisioning system 120-2 may combine system workflow 405, system workflow 420, and system workflow 425 together to produce combined workflow 415. Engineering system 120-3 may receive system workflow 405 from ordering system 120-1 (e.g., via API(s) 410), and may receive system workflow 420 from provisioning system 120-2 (e.g., via API(s) 410). Engineering system 120-3 may combine system workflow 405, system workflow 420, and system workflow 425 together to produce combined workflow 415.

System workflow 420 may include a workflow (e.g., workflow 310) generated by provisioning system 120-2 in response to order 430 being received from ordering system 120-1. System workflow 420 may include various tasks (e.g., tasks 320) associated with functions performed by provisioning system 120-2, such as a task for checking if there is a physical connection between the two locations in the telecommunications network, a task for creating a necessary bandwidth via the physical connection (e.g., when the physical connection is present), a task for requesting from engineering system 120-3 that the physical connection be established (e.g., when the physical connection is not present), etc. Provisioning system 120-2 may forward order 430 to system workflow 425 of engineering system 120-3, and may provide system workflow 420 to API(s) 410 of provisioning system 120-2.

System workflow 425 may include a workflow (e.g., workflow 310) generated by engineering system 120-3 in response to order 430 being received from provisioning system 120-2. System workflow 425 may include various tasks (e.g., tasks 320) associated with functions performed by engineering system 120-3, such as a task for determining a shortest route between the two locations in the telecommunications network, a task for obtaining government approval to install the physical connection between the two locations, a task for procuring required materials (e.g., via a procurement system) to install the physical connection, a task for providing the determined shortest route and the procured materials to field engineers installing the physical connection, a task for installing the cables for the physical connection, etc. Engineering system 120-3 may provide system workflow 425 to API(s) 410 of engineering system 120-3.

In one example implementation, ordering system 120-1, provisioning system 120-2, and engineering system 120-3 may each utilize a different methodology to generate system workflows 405, 420, and 425, respectively. For example, ordering system 120-1 may generate system workflow 405 using an information-intensive, document-driven workflow methodology; provisioning system 120-2 may generate system workflow 420 using a stochastic workflow methodology; and engineering system 120-3 may generate system workflow 425 using an "if-else" loops methodology.

As further shown in FIG. 4, user device 110 may access ordering system 120-1 (e.g., via a login 450 or other similar access method), and may retrieve workflows 455 from ordering system 120-1. Workflows 455 may include one or more of system workflow 405, combined workflow 415, system workflow 420, and system workflow 425. User device 110 may also access provisioning system 120-2 (e.g., via a login 460 or other similar access method), and may retrieve workflows 455 from provisioning system 120-2. Furthermore, user device 110 may access engineering system 120-3 (e.g., via a login 465 or other similar access method), and may retrieve workflows 455 from engineering system 120-3. Thus, user device 110 may be able to view and/or control any of workflows 455 (e.g., system workflow 405, combined workflow 415, system workflow 420, and/or system workflow 425) from any system (e.g., ordering system 120-1, provisioning system 120-2, and/or engineering system 120-3). In contrast, in current systems, if user device 110 is connected to ordering system 120-1, user device 110 may only view system workflow 405 produced by ordering system 120-1, and cannot view combined workflow 415, system workflow 420 (e.g., provided by provisioning system 120-2), and system workflow 425 (e.g., provided by engineering system 120-3).

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
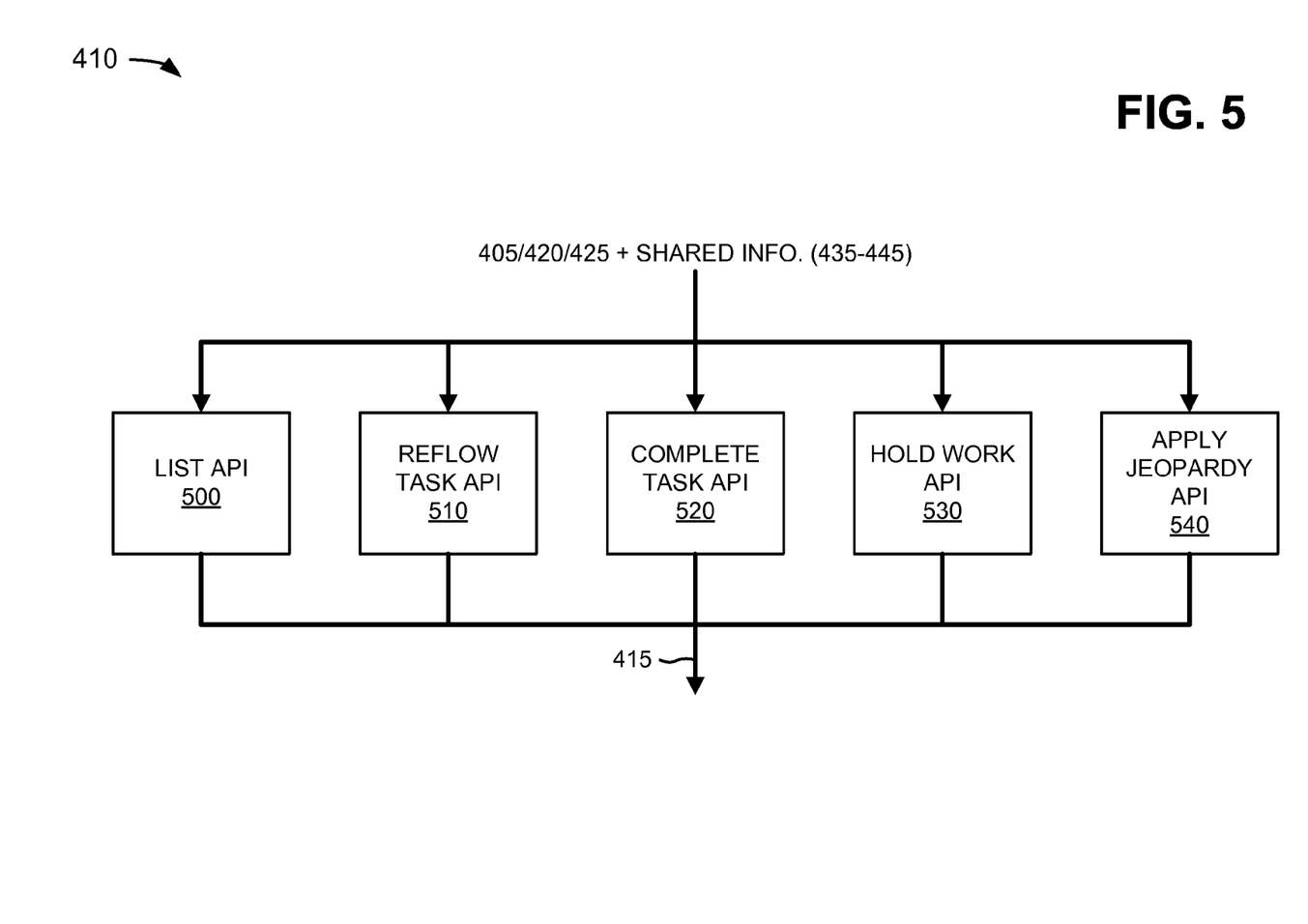
FIG. 5 is a diagram of example functional components of application programming interfaces (APIs) shown in FIG. 4.

FIG. 5 is a diagram of example functional components of APIs 410. As shown, APIs 410 may include a list API 500, a reflow task API 510, a complete task API 520, a hold work API 530, and an apply jeopardy API 540. In one example implementation, one or more of the functions described in connection with FIG. 5 may be performed by one or more of the example components of device 200 (FIG. 2).

List API 500 may include hardware or a combination of hardware and software that may receive system workflow 405, system workflow 420, system workflow 425, and/or shared information 435-445, and may utilize work unit details parameters and work identifier parameters to generate combined workflow 415. The work unit details parameters may include all tasks (e.g., tasks 320) which together may form a workflow, such as, for example, a task identifier, a task name, a task status, a list of predecessor tasks, a list of successor tasks, dependencies of a task on other tasks, etc. The work identifier parameters may include parameters that uniquely identify a transaction (e.g., order 430) in a workflow.

Reflow task API 510 may include hardware or a combination of hardware and software that may receive system workflow 405, system workflow 420, system workflow 425, and/or shared information 435-445, and may utilize a task identifier parameter and an audit details parameter to generate combined workflow 415. The task identifier parameter may include a parameter that uniquely identifies a task in a workflow. The audit details parameter may include a parameter that identifies a user who initiates a reflow request (e.g., a request to reorganize a workflow or tasks associated with a workflow), and provides remarks from the user as to why the reflow is performed.

Complete task API 520 may include hardware or a combination of hardware and software that may receive system workflow 405, system workflow 420, system workflow 425, and/or shared information 435-445, and may utilize a task identifier parameter and an audit details parameter to generate combined workflow 415. The task identifier parameter may include a parameter that uniquely identifies a task in a workflow. The audit details parameter may include a parameter that identifies a user who initiates a task complete request (e.g., a request to complete one or more tasks associated with a workflow), and provides remarks from the user as to why the task complete is performed.

Hold work API 530 may include hardware or a combination of hardware and software that may receive system workflow 405, system workflow 420, system workflow 425, and/or shared information 435-445, and may utilize a work identifier parameter and an audit details parameter to generate combined workflow 415. The work identifier parameter may include a parameter that uniquely identifies work in a workflow. The audit details parameter may include a parameter that identifies a user who initiates a hold work request (e.g., a request to place on hold work associated with a workflow), and provides remarks from the user as to why the hold work is performed.

Apply jeopardy API 540 may include hardware or a combination of hardware and software that may receive system workflow 405, system workflow 420, system workflow 425, and/or shared information 435-445, and may utilize a work identifier parameter, a jeopardy code, and an audit details parameter to generate combined workflow 415. The work identifier parameter may include a parameter that uniquely identifies work in a workflow. The jeopardy code may include a code that uniquely identifies a jeopardy situation (e.g., a problem) in a workflow. For example, a jeopardy situation may occur (e.g., and a jeopardy code may be generated) when a task is identified that will not meet the task's expected completion date (e.g., if a cable is being provided between two locations, a delay in approval for installing the cable may impact the timeliness of an order being provisioned). The audit details parameter may include a parameter that identifies a user who initiates a jeopardy code, and provides remarks from the user as to why the jeopardy code is generated.

Although FIG. 5 shows example functional components of APIs 410, in other implementations, APIs 410 may include fewer functional components, different functional components, differently arranged functional components, or additional functional components than depicted in FIG. 5. Alternatively, or additionally, one or more functional components of APIs 410 may perform one or more other tasks described as being performed by one or more other functional components of APIs 410.

Figure 6:
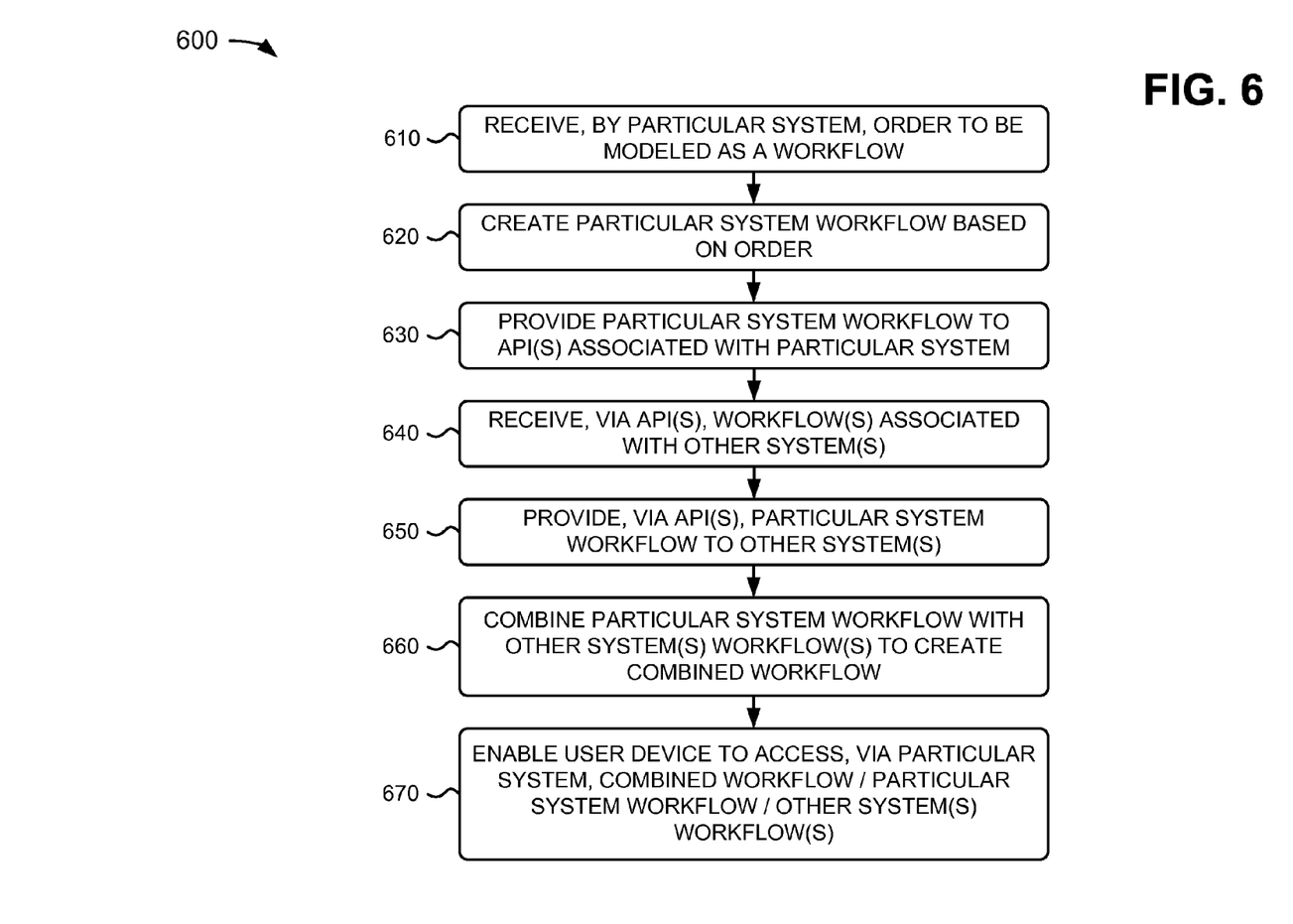
FIGS. 6 and 7 are flow charts of an example process for integrating workflows from various systems according to implementations described herein.
Figure 7:
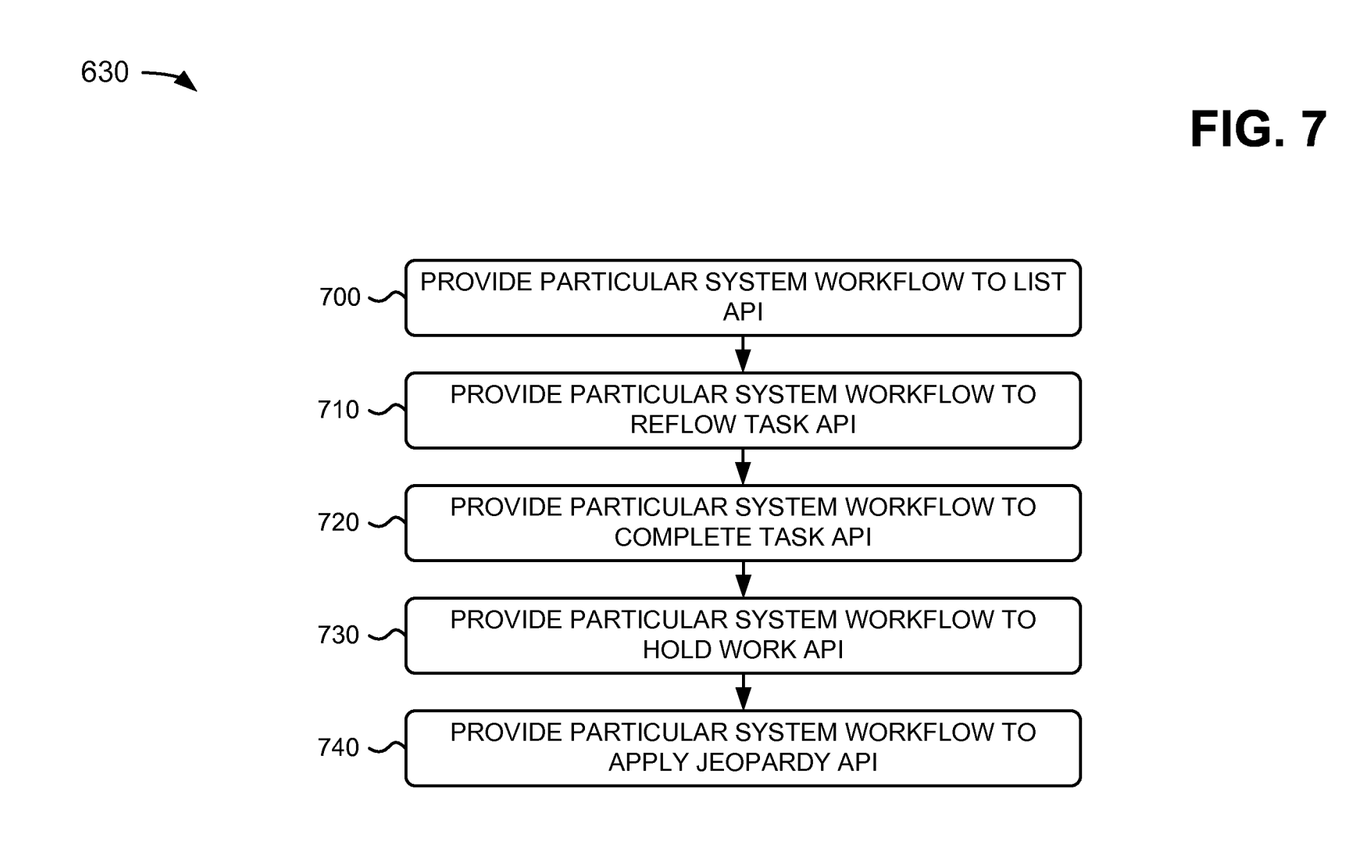

FIGS. 6 and 7 are flow charts of an example process 600 for integrating workflows from various systems according to implementations described herein. In one implementation, process 600 may be performed by one of systems 120. In another implementation, some or all of process 600 may be performed by another device or group of devices, including or excluding one of systems 120.

As shown in FIG. 6, process 600 may include receiving, by a particular system, an order to be modeled as a workflow (block 610), and creating a particular system workflow based on the order (block 620). For example, in implementations described above in connection with FIG. 4, system workflow 405 may include a workflow (e.g., workflow 310) generated by ordering system 120-1 in response to order 430 (e.g., to be modeled as a workflow) being received by ordering system 120-1. System workflow 405 may include various tasks (e.g., tasks 320) associated with functions performed by ordering system 120-1, such as a task for receiving order 430, a task for validating order 430 (e.g., based on an address of person associated with order 430), a task for validating order 430 (e.g., based on a credit worthiness of the person associated with order 430), etc.

As further shown in FIG. 6, process 600 may include providing the particular system workflow to one or more APIs associated with the particular system (block 630), and receiving, via the API(s), one or more workflows associated with one or more other systems (block 640). For example, in implementations described above in connection with FIG. 4, ordering system 120-1 may provide system workflow 405 to API(s) 410 of ordering system 120-1. API(s) 410 may enable ordering system 120-1 to share information 435 (e.g., information associated with system workflow 405) with provisioning system 120-2, and may enable ordering system 120-1 to share information 445 (e.g., information associated with system workflow 405) with engineering system 120-3.

Returning to FIG. 6, process 600 may include combining the particular system workflow with the other system(s) workflow(s) to create a combined workflow (block 660), and enabling a user device to access, via the particular system, the combined workflow, the particular system workflow, and/or the other system(s) workflow(s) (block 670). For example, in implementations described above in connection with FIG. 4, combined workflow 415 may include a combination of the workflows (e.g., workflows 310) generated by ordering system 120-1 (e.g., system workflow 405), provisioning system 120-2 (e.g., system workflow 420), and engineering system 120-3 (e.g., system workflow 425). In one example, ordering system 120-1 may receive system workflow 420 from provisioning system 120-2 (e.g., via API(s) 410), and may receive system workflow 425 from engineering system 120-3 (e.g., via API(s) 410). Ordering system 120-1 may combine system workflow 405, system workflow 420, and system workflow 425 together to produce combined workflow 415. User device 110 may access ordering system 120-1 (e.g., via login 450 or other similar access method), and may retrieve workflows 455 from ordering system 120-1. Workflows 455 may include one or more of system workflow 405, combined workflow 415, system workflow 420, and system workflow 425.

Process block 630 may include the process blocks depicted in FIG. 7. As shown in FIG. 7, process block 630 may include one or more of providing the particular system workflow to a list API (block 700), providing the particular system workflow to a reflow task API (block 710), providing the particular system workflow to a complete task API (block 720), providing the particular system workflow to a hold work API (block 730), and providing the particular system workflow to an apply jeopardy API (block 740). For example, in implementations described above in connection with FIGS. 4 and 5, ordering system 120-1 may provide system workflow 405 to API(s) 410 of ordering system 120-1. API(s) 410 may include one or more rules and/or specifications that a software program (e.g., provided in one system 120) can follow to access and make use of services and/or resources provided by another particular software program (e.g., provided in another system 120) that implements API(s) 410. API(s) 410 may serve as an interface between different software programs (e.g., provided in different systems 120), and may facilitate interaction of the different software programs. In one example, API(s) 410 may include list API 500, reflow task API 510, complete task API 520, hold work API 530, and apply jeopardy API 540.

Systems and/or methods described herein may enable workflows from different systems (e.g., a provisioning system, a procurement system, etc.) to be integrated so that workflows spanning multiple systems may be viewed and/or controlled by a user device (e.g., a computer) connected to any of the multiple systems.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device of a particular information technology (IT) system, wherein the particular IT system is connected to another IT system, the method comprising:
    receiving, by the computing device, a transaction to be modeled as a workflow, wherein the workflow is a depiction of work of at least one person and includes a sequence of operations;
    creating, by the computing device, a particular system workflow based on the transaction;
    providing, by the computing device, the particular system workflow to at least one application programming interface (API) associated with the particular IT system;
    receiving, by the computing and via the at least one API, another system workflow associated with the other IT system;
    combining, by the computing device, the particular system workflow with the other system workflow to create a combined workflow, wherein the combined workflow includes a combination of the particular system workflow and the other system workflow; and
    enabling, by the computing device, a user device to access, via the particular IT system, one or more of the combined workflow, the particular system workflow, or the other system workflow.

2. The method of claim 1, further comprising:
    providing, via the at least one API, the particular system workflow to the other IT system.

3. The method of claim 1, where the user device is able to access, via the other IT system, one or more of the combined workflow, the particular system workflow, or the other system workflow.

4. The method of claim 1, further comprising:
    enabling the user device to control, via the particular IT system, one or more of the combined workflow, the particular system workflow, or the other system workflow.

5. The method of claim 1, where the at least one API comprises one of:
    a list API,
    a reflow task API,
    a complete task API,
    a hold work API, or
    an apply jeopardy API.

6. The method of claim 1, where the particular IT system does not permit a change to the other system workflow that would impact the particular system workflow.

7. The method of claim 1, where:
    the particular system workflow includes a virtual representation of functions performed by the particular IT system based on the transaction, and
    the other system workflow includes a virtual representation of functions performed by the other IT system based on the transaction.

8. A computing device of a particular system, the computing device comprising:
    a memory to store a plurality of instructions; and
    a processor to execute instructions in the memory to:
        receive an order to be modeled as a workflow, wherein the workflow is a depiction of work of at least one person and includes a sequence of operations,
        create a particular system workflow based on the order,
        provide the particular system workflow to application programming interfaces (APIs) associated with the particular system,
        receive, via the APIs, a workflow associated with another system,
        provide, via the APIs, the particular system workflow to the other system,
        combine the particular system workflow with the other system workflow to create a combined workflow, and
        enable a user device to access, via the particular system, one or more of the combined workflow, the particular system workflow, or the other system workflow.

9. The computing device of claim 8, where the user device is able to access, via the other system, one or more of the combined workflow, the particular system workflow, or the other system workflow.

10. The computing device of claim 8, where the processor is further to execute instructions in the memory to:

enable the user device to control, via the particular system, one or more of the combined workflow, the particular system workflow, or the other system workflow.

11. The computing device of claim 8, where the APIs comprise one or more of:
   a list API that includes work unit details parameters and a first work identifier parameter,
   a reflow task API that includes a first task identifier parameter and a first audit details parameter,
   a complete task API that includes a second task identifier parameter and a second audit details parameter,
   a hold work API that includes a second work identifier parameter and a third audit details parameter, or
   an apply jeopardy API that includes a third work identifier parameter, a jeopardy code, and a fourth audit details parameter.

12. The computing device of claim 8, where the particular system does not permit a change to the other system workflow that would introduce a change the particular system workflow.

13. The computing device of claim 8, where:
   the particular system workflow includes tasks that are virtual representations of functions performed by the particular system based on the order, and
   the other system workflow includes tasks that are virtual representations of functions performed by the other system based on the order.

14. One or more non-transitory computer-readable media storing instructions executable by one or more processors of a computing device of a particular system, the media storing one or more instructions for:
   receiving an order to be modeled as a workflow, wherein the workflow is a depiction of work of at least one person and includes a sequence of operations;
   creating a particular system workflow based on the order;
   providing the particular system workflow to at least one application programming interface (API) associated with the particular system;
   receiving, via the at least one API, a workflow associated with another system;
   combining the particular system workflow with the other system workflow to create a combined workflow; and
   enabling a user device to access or control, via the particular system, one or more of the combined workflow, the particular system workflow, or the other system workflow.

15. The media of claim 14, where the media stores one or more instructions for:
   providing, via the at least one API, the particular system workflow to the other system.

16. The media of claim 14, where the user device is able to access, via the other system, one or more of the combined workflow, the particular system workflow, or the other system workflow.

17. The media of claim 14, where the media stores one or more instructions for:
   enabling the user device to control, via the particular system, one or more of the combined workflow, the particular system workflow, or the other system workflow.

18. The media of claim 14, where the at least one API comprises one of:
   a list API,
   a reflow task API,
   a complete task API,
   a hold work API, or
   an apply jeopardy API.

19. The media of claim 14, where the particular system does not permit a change to the other system workflow that would impact the particular system workflow.

20. The media of claim 14, where:
   the particular system workflow includes a virtual representation of functions performed by the particular system based on the order, and
   the other system workflow includes a virtual representation of functions performed by the other system based on the order.

* * * * *